Figure 1:
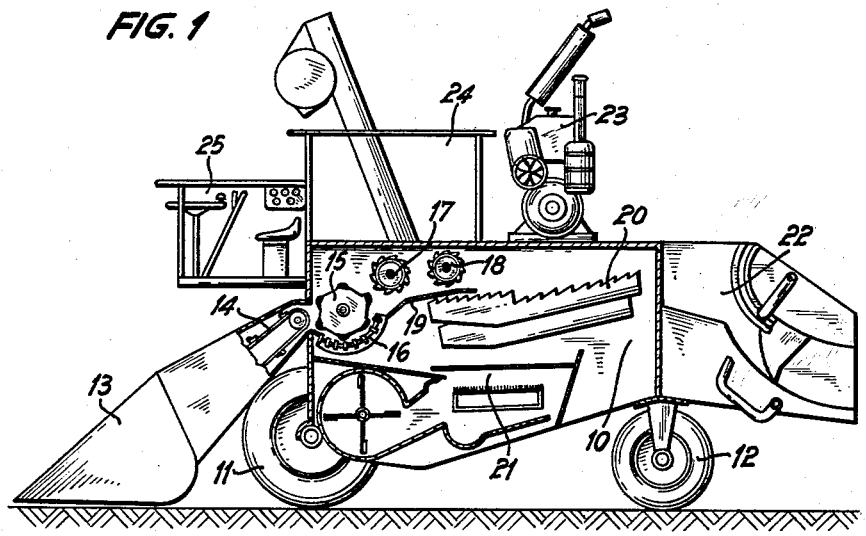

INVENTOR
HELMUT CLAAS
BY
Michael S. Striker
ATTORNEY

United States Patent Office 3,106,921
Patented Oct. 15, 1963

3,106,921
THRESHING MACHINES
Helmut Claas, 4 Kattenpatt, Harsewinkel,
Westphalia, Germany
Filed Sept. 6, 1960, Ser. No. 54,125
Claims priority, application Germany Sept. 5, 1959
3 Claims. (Cl. 130—27)

The invention relates to a threshing apparatus intended in particular for combine harvesters, in which two drums located one behind the other exhibiting striking and throwing surfaces and rotating in the same direction, are arranged behind the thresher drum which coacts with a thresher concave. As a rule in the case of threshing apparatuses there is actually arranged behind the thresher drum a so-called turning or beater drum which revolves in the direction of rotation agreeing with the thresher drum and catches the material being threshed such as grain and the like thrown off by the thresher drum, guiding it in a direction towards the shaker. The turning drum moreover directly forms a means of transport for the straw and the like passing through. The barrel surfaces of such turning drums have already been developed in various manners, in order to catch and deflect the sprinkled grain in a particularly effective manner, so that it does not pass directly into rear regions of the shaker, where it might get lost in some cases. Experience has now confirmed that in the case of these known embodiments it is not possible even under the most favourable circumstances to exclude certain grain losses of this kind. This can be attributed at least in part to the fact that between the periphery of the turning drum and the grating or the like which forms the rest for the material being threshed, a passage remains through which the spraying grain may fly without being caught by the turning drum. Nor are such grain losses eliminated in the case of further known arrangements which exhibit, located behind one another, several drums set with striking and throwing surfaces and rotating in the same direction, for in the case of known embodiments the latter operate over a guide-way for the material running essentially in a longitudinal direction, which is formed at least in part by the shaker. The drums here act essentially merely as means of transport for the material passing through. It is moreover known to place behind a thresher drum two drums located in the same longitudinal position and rotating in opposite directions, between which the material leaving the threshing apparatus passes. Such arrangements have not proved successful in practice, because the drums in this arrangement obstruct the constant passage of the material to be threshed and hence reduce the efficiency and operational reliability of the threshing mechanism.

The task underlying the invention is to create a threshing apparatus of the type initially referred to, which ensures fault-free operation and a high yield of grain even under the least favourable working conditions. This is attained according to the invention essentially in that the drums placed behind the thresher drum are arranged above an operationally stationary plating bridging over the interval between the thresher concave and the straw shaker, which guides the material passing through against portions of the barrel surface of the rear drum facing towards the passage between the front drum in the direction of passage and the grating. The material leaving the passage between the front drum and the grating is thereby deflected once more against the grating by the rear drum in the direction of passage, in order to arrive reliably at the inlet portion of the straw shaker. The latter is therefore utilised to a high degree of efficiency over its entire length. Moreover the rear drum in the direction of passage prevents spraying grain from passing from the threshing apparatus directly on to the shaker, as where it is not caught by the front drum it is deflected by the rear drum on to the grating. The passage of the material being threshed is not then impaired. It is even possible to increase the operational reliability and in some cases the efficiency of the threshing apparatus, in that in the choice of speed of revolution respectively peripheral velocity of the first drum greater account is taken as compared with earlier embodiments of reliable transport of the material being threshed. In this respect it has proved convenient according to a further feature of the invention to cause the drum arranged on the outlet side, i.e. the rear drum to operate with a lower peripheral velocity as compared with the first turning drum.

In order to obtain a good degree of efficiency of the threshing apparatus and in particular to relieve the screening apparatus it is recommended according to a further feature of the invention to arrange the rear drum above a portion of the grating bridging over the space between the thresher concave and the shaker which falls away towards the outlet side. It is thereby ensured in a particularly simple manner that the material to be threshed does not perhaps run through essentially tangentially below the rear drum, but is decisively deflected by the latter.

There is to a large extent a free choice in the development of the two drums placed behind the thresher apparatus. It is for example possible to develop the two drums alike. As a rule however, it will be more convenient to select varying executions in order to solve in a particularly effective manner the tasks associated with the two drums in each case.

Figure 2:
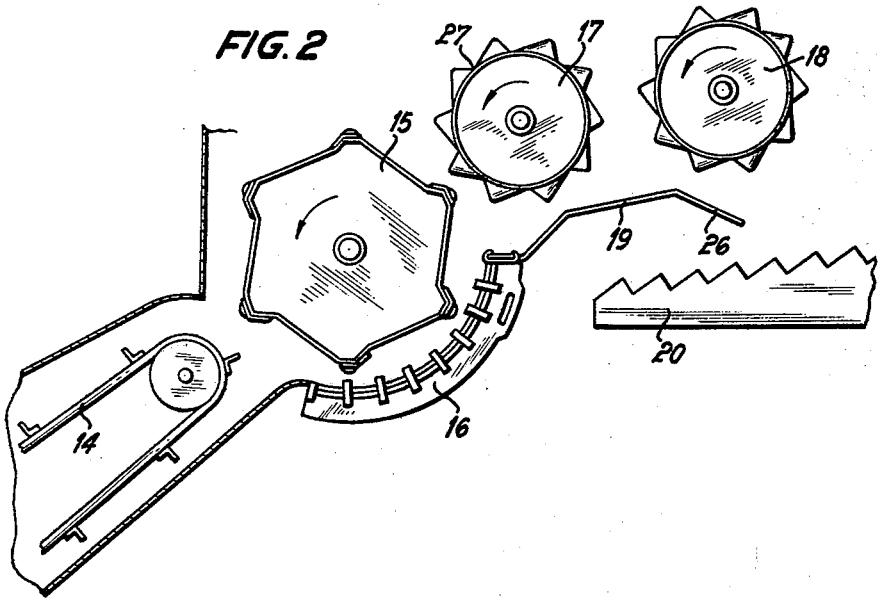

The subject of the invention is represented in an exemplified embodiment in the drawing, which shows:

FIGURE 1 a threshing machine in partially sectioned side elevation,

FIGURE 2 the threshing machine in schematic and side elevation on a larger scale.

According to FIGURE 1, the exemplifying embodiment is based upon an automobile combine harvester, which exhibits a housing 10 which is provided with pairs of running wheels 11, 12. On the end face of the housing 10 is mounted a cutter table 13 from which the material is passed via a circulating endless conveyor chain 14 to the threshing apparatus which is arranged in the housing 10. The latter embraces essentially a thresher drum 15 which coacts with a thresher concave 16, and two drums 17 and 18 rotating in the same sense as the thresher drum 15, which operate above a grating 19 which bridges over the interval between the thresher concave 16 and a straw shaker 20. The drums 15, 17 and 18 are arranged with their axes parallel and preferably rotatably mounted in opposite side walls of the housing 10. The grain detached during threshing passes for the greater part directly through the thresher concave 16 respectively the grating 19 to the cleansing apparatus 21 which may be developed in an intrinsically known manner. The material passing through is moreover guided across the straw shaker 20, where any grain which may remain therein is separated out. The straw after leaving the straw shaker 20 passes for example to a straw press 22. On the housing 10 of the combine harvester, which is driven by an internal combustion engine 23, is arranged a sack-filling stand 24 to which the material is passed in an intrinsically known manner. There is additionally provided on the housing 10 a driving position 25 for the driver of the machine. As shown in particular by FIGURE 2 the grating 19 is directly adjacent to the thresher concave 16 and its rear part 26 in the direction of flow follows a course angled off downwards, while this region is located below the rear drum 18 in the direction of flow. The drums 17 and 18 exhibit throughout their length continuous pockets 27 which are bounded by striking and throwing surfaces. The throwing surfaces here extend from the base of the pockets 27, which are roughly triangular in cross section, rising in an outward direction and following with respect to the direction of rotation. The drums 17 and 18 rotate operationally, as indicated by the arrows, in the same direction as the thresher drum 15. The grain thrown off by the thresher drum, and not caught by the drum 17, i.e. which flies through the passage present between the drum 17 and the grating 19, is caught by the drum 18. Apart from this the entire material passing through is deflected by the drum 18 against the shaker 20, so that in particular spraying grain and the like cannot, as in the case of embodiments previously known, fly as far as the rear regions of the shaker 20.

The revolving drums 15, 17 and 18 may be driven in common by belts, chains or the like. The speeds of revolution are preferably so balanced, that the peripheral velocities decrease towards the outlet side. The cross-sectional forms and elaborations of the drums 17 and 18 may be selected at will.

The embodiment represented is, as has already been mentioned, only an exemplifying realization of the invention. The latter is not restricted thereto. On the contrary, many other embodiments and applications are possible. The apparatus according to the invention may for example also be applied with good effect in the case of stationary threshing machines, although the advantages are particularly obvious in the case of combine harvesters, because in this case only a limited space is available for the shaker arrangements, so that the grain yield can be appreciably improved by the arrangement according to the invention.

I claim:

1. In an apparatus for threshing grain containing materials and for separating grains from the straw, in combination, a rotary thresher drum; a thresher concave adjacent to and defining with said drum a passage through which grain containing material passes and is threshed by said drum so as to separate grains from the straw and to advance the straw and some grains beyond said passage; a first and a second rotary beater drum, said drums disposed at the downstream side of said passage and having axes parallel with the axis of said thresher drum, each of said beater drums having pockets extending substantially the full axial length thereof and one of said beater drums being more distant from said thresher drum than the other beater drum; a grating located at the downstream side of said concave, said grating spaced from, located below and defining with said beater drums a second passage through which the straw passes under the action of said beater drums to separate at least some grains from the straw, said grating having a portion which is adjacent to said concave and is inclined in a direction to guide, in cooperation with the other beater drum, the straw beaten by said other beater drum against pockets of said one beater drum moving toward said grating; and straw shaker means disposed at the downstream side of said second passage for advancing the straw in a direction away from said beater drums and for shaking off grains which are entrained by the straw from said second passage, said grating having a portion located spaced from said first mentioned portion beneath said one beater drum and directed toward said straw shaker means so as to guide the straw onto a portion of the straw shaker means adjacent said grating.

2. In an apparatus for threshing grain containing materials and for separating grains from the straw, particularly in a harvester combine, in combination, a rotary drum; thresher concave adjacent to and defining with said drum a passage through which grain containing material passes and is threshed by said drum so as to separate grains from the straw and to advance the straw and some grains beyond said passage; a first and a second rotary beater drum, said drums disposed at the downstream side of said passage and having axes parallel with the axis of said thresher drum, each of said beater drums having pockets extending substantially the full axial length thereof and one of said beater drums being more distant from said thresher drum than the other beater drum; a grating located at the downstream side of said concave, said grating spaced from, located below and defining with said beater drums a second passage through which the straw passes under the action of said beater drums to separate at least some grains from the straw, said grating having a portion which is adjacent to said concave and is inclined in a direction to guide, in cooperation with the other beater drum, the straw beaten by said other beater drum against pockets of said one beater drum moving toward said grating; and straw shaker means disposed at the downstream side of said second passage at a level below said beater drums for advancing the straw in a direction away from said beater drums and for shaking off grains which are entrained by the straw from said second passage, said grating having an end portion located spaced from said first mentioned portion beneath said one drum and inclined downwardly toward said shaker means so as to guide the straw onto the portion of said shaker means immediately adjacent to said grating.

3. In an apparatus for threshing grain containing materials and for separating grains from the straw, in combination, a rotary thresher drum; a thresher concave adjacent to and defining with said drum a passage through which grain containing material passes and is threshed by said drum so as to separate grains from the straw and to advance the straw and some grains beyond said passage; a first and a second rotary beater drum, said drums disposed at the downstream side of said passage and having axes parallel with the axis of said thresher drum, each of said beater drums having pockets extending substantially the full axial length thereof and one of said beater drums being more distant from said thresher drum than the other beater drum; means for driving said beater drums at different speeds so that the speed of said other beater drum exceeds the speed of said one beater drum; a grating located at the downstream side of said concave, said grating spaced from, located below and defining with said beater drums a second passage through which the straw passes under the action of said beater drums to separate at least some grains from the straw, said grating having a portion which is adjacent to said concave and is inclined in a direction to guide, in cooperation with the other beater drum, the straw beaten by said other geater drum against pockets of said one beater drum moving toward said grating; and straw shaker means disposed at the downstream side of said second passage for advancing the straw in a direction away from said beater drums and for shaking off grains which are entrained by the straw from said second passage, said grating having a portion located spaced from said first mentioned portion beneath said one beater drum and directed toward said straw shaker means so as to guide the straw onto a portion of the straw shaker means adjacent said grating.

References Cited in the file of this patent

UNITED STATES PATENTS

| 1,405,766 | Downing | Feb. 7, 1922 |
| 1,625,953 | Landquist | Apr. 26, 1927 |

FOREIGN PATENTS

| 127,498 | Australia | Apr. 16, 1948 |